United States Patent [19]

Callaghan

[11] 4,109,191

[45] Aug. 22, 1978

[54] ROTATOR WITH REMOTE INDICATOR AND SELF-SYNCHRONIZATION

[75] Inventor: John David Callaghan, Cherry Hill, N.J.

[73] Assignee: RCA Corporation, New York, N.Y.

[21] Appl. No.: 803,224

[22] Filed: Jun. 3, 1977

[51] Int. Cl.² ............................................. G05B 11/14
[52] U.S. Cl. ...................................... 318/673; 318/85; 318/436; 318/469
[58] Field of Search ................. 318/85, 673, 675, 436, 318/626, 469

[56] References Cited

U.S. PATENT DOCUMENTS

| | | | |
|---|---|---|---|
| 3,495,143 | 2/1970 | Deming | 318/85 X |
| 3,860,859 | 1/1975 | Buckley | 318/673 X |
| 4,023,080 | 5/1977 | Tanimoto | 318/675 X |

*Primary Examiner*—B. Dobeck

*Attorney, Agent, or Firm*—Eugene M. Whitacre; Paul J. Rasmussen; Robert L. Troike

[57] ABSTRACT

An antenna rotator of the type including a first remote drive motor for rotating a remote shaft and a control unit including a second motor for driving an indicator-control member into alignment with a preselect member is described. Self-synchronization and de-energization of the two motors is provided herein when the shaft has been rotated to an end stop position and the indicator-control member is not in alignment with the preselect member. This self-synchronization and de-energization is achieved by sensing the increased current levels caused when the first motor is prevented from rotating by the end stop to apply the energizing potentials being applied to the first motor directly to the second motor whereupon the indicator-control member is aligned with the preselect member and both motors are de-energized.

6 Claims, 1 Drawing Figure

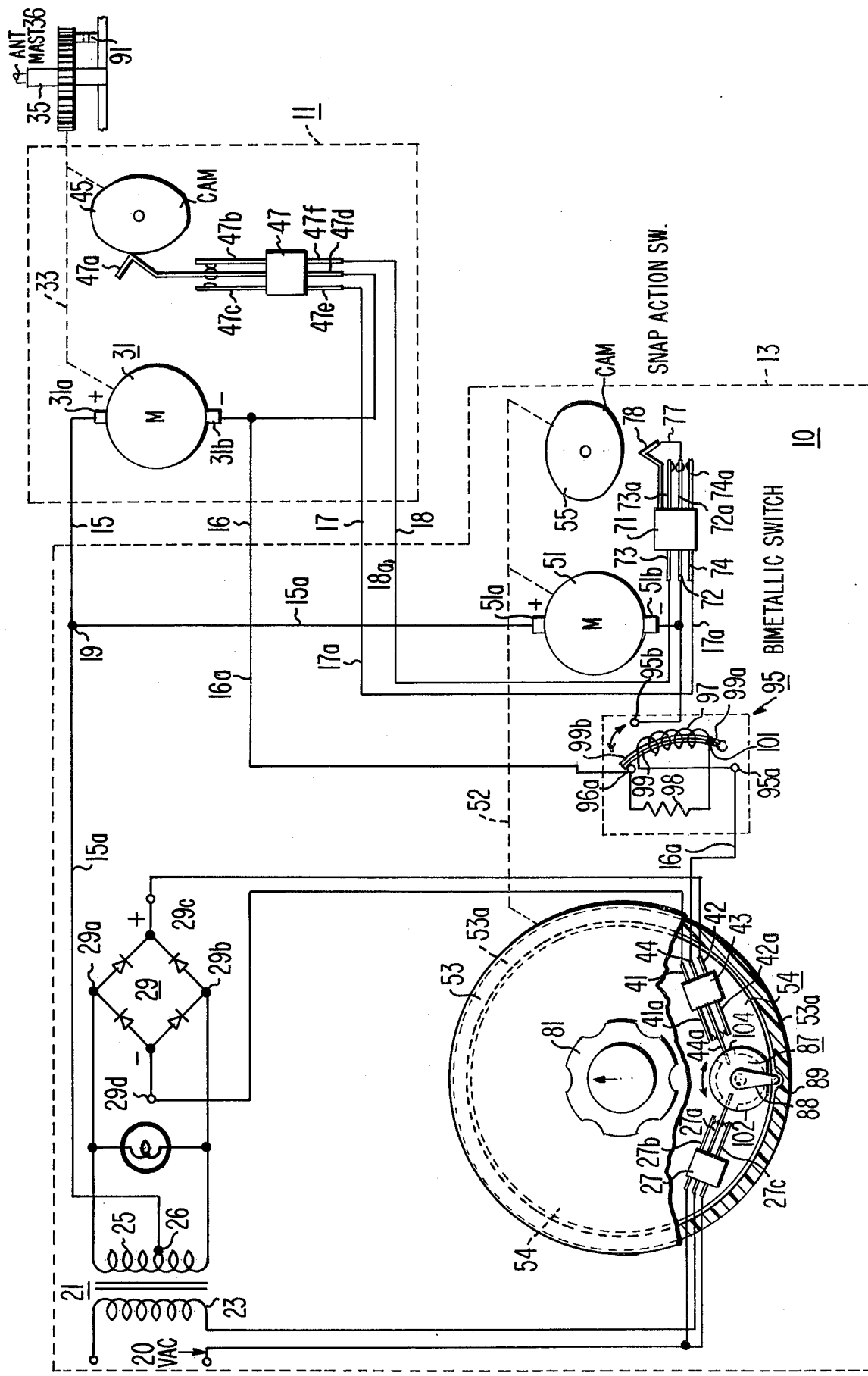

ROTATOR WITH REMOTE INDICATOR AND SELF-SYNCHRONIZATION

BACKGROUND OF THE INVENTION

This invention relates to a rotator system and particularly to the use of a rotator system for antennas with self-synchronization of a position indicator which controls primary power.

In antenna rotators, a drive unit including a rotatable shaft is usually located at a remote point such as on a roof top and a local control unit is usually at the receiver (top of the television set for example) to preselect direction and provide a local indication of the rotated position of the rotatable shaft and control power to the drive unit. The drive units usually include an end stop to prevent rotation of the antenna for more than about 360°. This is to prevent twisting and pulling of the feed line wires about the support mast. Occasionally, the drive unit and local control unit lose synchronization and the drive unit reaches the end stop position before the control unit is de-energized, leaving power on. The drive unit motor could be damaged unless power is manually shut off or power shut off by synchronization is achieved.

Summary of the Invention

An antenna rotator of the type including a first remote drive motor for rotating a remote shaft and a control unit including a second motor for driving indicator-control member into alignment with a preselect member is described. The improvement herein is self-synchronization and de-energization of the two motors when the shaft has been rotated to an end stop position. The improvement includes coupling means for applying energizing potentials to the first motor and means coupled to the coupling means and responsive to increased current levels associated when the first motor is prevented from rotation by the end stop for applying the energizing potentials directly to the second motor whereby the second motor is energized until alignment of the indicator-control member and preselect member is achieved and de-energization of both motors.

BRIEF DESCRIPTION OF THE DRAWING

The single FIGURE is a functional sketch of the rotator in accordance with a preferred embodiment of the present invention.

DESCRIPTION OF THE INVENTION

Referring to the FIGURE, a rotator system 10 includes a remote drive unit 11 and a local control unit 13 and four wires 15, 16, 17 and 18 connected between the control unit 13 and the remote drive unit 11. The control unit 13 may be placed on top of the television set and the drive unit 11 may be located at a remote position such as at an antenna mast supported from or extending above the rooftop of a dwelling. Turning to the remote drive unit 11, the drive unit includes a DC motor 31 and a gear train 33. A cam 45 and a rotatable shaft 35 to which an antenna mast 36 may be mounted are coupled to the gear train 33 which in turn is coupled to the D.C. motor 31. Upon rotation of the drive unit motor 31, the gear train 33 is activated and the shaft 35, the mast 36 and the cam 45 is rotated. The drive unit cam 45 in this example is geared to make one revolution for every 3° of rotation by the drive unit shaft 35.

The D.C. motor 31 includes terminals 31a and 31b. The terminal 31a is coupled to lead wire 15 and the terminal 31b is coupled to lead wire 16. A multiposition switch 47 has the center moveable contact arm 47a riding on cam 45. The moveable contact arm 47a is connected via terminal 47d to terminal 31b of the D.C. motor 31. The two other terminals 47e and 47f of switch 47 are coupled respectively to wires 17 and 18. As the cam 45 rotates, the center contact arm 47a of multiposition switch 45 alternately makes contact with contacts 47c or normally closed contact 47b to alternately provide the energizing potential at wire 16 to wires 17 or 18 via terminals 47e and 47f of switch 47. With cam 45 in the position shown, arm 47a makes contact with contact 47b.

Turning to the control unit 13, the manner in which energizing potentials are applied to the drive unit is first described. This is followed by a discussion of the manner in which a local indication and control of the rotation of the drive unit motor is provided. At the control unit 13, 120 volts A.C. (alternating current) is applied across terminals 14a and 14b of primary winding 23 of transformer 21. The transformer 21 steps down the voltage and provides 20 volts A.C. at the secondary winding 25. A main on/off switch 27 is coupled in series with the primary 23 of transformer 21. When contacts 27a and 27b of switch 27 are closed or when contacts 27a and 27c are closed, the 120 volts A.C. is applied across the primary coil 23 and coupled to the secondary winding 25 of transformer 21. If the contacts 27b and 27c are open, the transformer 21 and consequently the control unit 13 and the entire rotator system 10 is de-energized.

The opening and closing of contacts 27b and 27c with respect to contact 27a is provided by an alignment and a misalignment, respectively, of preselector disk 54 and indicator-control disk 53. The indicator-control disk 53 has a ring-shaped extension 53a protruding from the under surface of the disk about the periphery thereof. A more detailed description of this mechanical structure is described in connection with FIGS. 2 and 3 of U.S. Pat. No. 3,831,074. Briefly, however, when a knob 81 is rotated clockwise or counterclockwise, the preselector disk 54 that is coupled thereto is rotated clockwise or counterclockwise. Switch 27 which for example is coupled to preselector disk 54 turns with the disk. The indicator-control disk 53 is spaced parallel to and above the preselector disk 54 on a shaft (see FIG. 3 of U.S. Pat. No. 3,831,074). Also fixed to the preselector disk 54 is a direction memory cam 87. The cam 87 is rotatably mounted to the disk 54 and has an extension 88 that fits into a groove 89 in the extension 53a of disk 53 when the disks 53 and 54 are aligned. The direction memory cam 87 has gaps 102 and 104 therein. Flexible leaf contact 27a extends into gap 102. When knob 81 rotates clockwise, the direction memory cam 87 rotates counterclockwise and causes the direction memory cam 87 to push contact 27a into connection with contact 27c. When knob 81 rotates counterclockwise, the direction memory cam rotates clockwise and causes contact 27a to connect with 27b. Contact 27a remains connected either to 27b or 27c until the disks are interaligned whereupon the direction memory cam 87 fits into the groove 89. When the control knob 81 is rotated so that disks 53 and 54 are misaligned, the primary coil 23 via switch 27 is energized. The 20 volts A.C. at the secondary 25 is applied to full wave diode bridge circuit 29 with terminals 29a and 29b coupled to the opposite ends of the secondary coil 25 and the output terminals 29c and 29d providing, respectively, positive and negative signals with respect to a common reference taken at the center tap 26 of secondary coil 25. The center tap 26 of secondary coil 25 is coupled via lead 15a coupled at terminal 31a to motor 31. Terminals 29c and 29d of full wave diode bridge circuit 29 are coupled, respectively, to terminals 41 and 42 of directional control switch 43. Terminal 44 of switch 43 is coupled via lead 16a at the control unit to wire 16. Switch 43 has its terminal 44 connected to a leaf contact 44a which extends into slot 104 of the direction memory cam 87. Terminal 41 of switch 43 is coupled to contact 41a and terminal 42 of switch 43 is coupled to contact 42a. When the knob 81 rotates clockwise, the direction memory cam 87 rotates counterclockwise and causes the direction memory cam 87 to push contact 44a and the connection with contact 41a. When the knob 81 rotates counterclockwise, the direction memory cam rotates clockwise and causes contact 44a to connect with contact 42a. Therefore, dependent upon the rotated direction of knob 81, either a negative or positive potential relative to a common is provided to conductor 16a. When the knob 81 is rotated causing misalignment of the extension 88 of cam 87 that fits in the groove 89, power is applied via switch 27 and the appropriate negative or positive potential relative to common is provided at a conductor 16a to the other side of the D.C. motor 31 producing D.C. current thereto causing the motor to rotate in either the clockwise or counterclockwise direction.

When the motor 31 rotates in either a clockwise or counterclockwise direction, it rotates the cam 45 and the antenna shaft 35. At the control unit 13, local indication and control of the rotation of the shaft and hence the pointed direction of the antenna is achieved by controlling the rotation of the indicator-controldisk 53. The indicator-control disk 53 is coupled by a gear train 52 to a D.C. control unit motor 51. Also coupled to the gear train 52 is control unit cam 55. Upon activation of the D.C. control unit motor 51, the gear train 52 is activated and the indicator-control disk 53 and the control unit cam 55 are rotated. The control unit cam 55 is geared to make one revolution every 3° of turn by the indicatorcontrol disk 53. The same ratio of turns that exists between the drive unit cam 45 and the antenna shaft 35 (120 to 1) exists between the control unit cam 55 and the indicatorcontrol disk 53. A snap action switch 71 has one terminal 73 connected via lead 18a to wire 18, which in turn is connected to one terminal 47f of switch 47. Switch 71 has a second terminal 74 which is coupled via lead 17a to wire 17, which in turn is coupled to a different terminal 47e of switch 47. The center terminal 72 of switch 71 is coupled to terminal 51b of the D.C. motor 51. The opposite terminal 51a of motor 51 is coupled at point 19 via lead 15a to common at tap 26 and to wire 15. Terminal 74 of switch 71 is coupled to normally open contact 74a. Terminal 73 is connected to normally closed contact 73a and the center terminal 72 is coupled to contact 72a which is connected via arm 77 to leaf arm 78. Leaf arm 78 forces center contact 72a to make contact with contact 74a when cam 55 is in the vertical position. When the knob 81 is rotated and the D.C. motor 31 is energized, the potential at wire 16 is coupled alternately via leads 17 or 18 to terminals 73 and 74, which causes alternately via contacts 72a, 73a and 74a that same potential to be applied to terminal 51b of the D.C. motor 51. This causes the D.C. motor 51 to rotate in the same sense and cause via mechanical linkage 52 the disk 53 to rotate in the direction to cause alignment and indicate the rotated position of the antenna. Each time cam 45 is rotated 90°, the potential is switched between wires 17 and 18 and that potential is switched via switch 71 until cam 55 is rotated 90° to remove that potential from motor 51 (shutting itself off). When the disks 53 and 54 are aligned, the power is shut off via switch 27 and the energizing potential is removed via switch 43 to the terminal 31b of the motor removing the voltage through switch 71 to terminal 51b of the indicator motor 51. In order to keep synchronization, motor 51 must turn faster than motor 31. The cam 55 is driven faster than cam 45 so that cam 55 turns one-quarter of a revolution (90°) before cam 45 makes one-quarter revolution. When cam 55 rotates, it removes the energizing potential from motor 51 by connecting the motor input to the other lead. If the cam 45 continues to rotate, this other lead is coupled to the energizing potential and motor 51 is again energized.

In the above described antenna rotator, the rotator is allowed to drive the shaft through approximately 360° but with an end stop 91 which prevents the shaft from rotating much more than approximately 360° in either direction. This is done to prevent multiple turns of the feed line wires about the mast and pulling of these wires. If the two motors 31 and 51 should be out of synchronism with each other, a situation can arise in which the motor 31 has driven the shaft such that it is resting against the end stop position but the control motor has not moved the indicator-control disk 53 into alignment with the preselector disk 54. This causes switches 27 and 43 to remain closed and could cause destruction of the unit. A system is provided herein for permitting self-synchronization under these conditions and basically consists of a self-synchronizing switch 95 located in lead 16a between terminal 44 of switch 43 and terminal 31b of drive motor 31. Switch 95 has a first terminal 95a connected to terminal 44 of switch 43, a second terminal 96a connected to terminal 31b of motor 31 and terminal 47d of switch 47 and a third terminal 95b connected to terminal 51b of motor 51. Between terminals 95a and 96a is a coil 97 in series with a resistor 98. A moveable bimetallic contact 99 is coupled at one end 99a to the junction 101 of coil 97 and the resistor 98. The bimetallic contact 99 extends through coil 97 under normal current conditions, makes contact at end 99b with output terminal 96a. When the D.C. motor 31 is no longer able to rotate when it is operated against the end stop 91, the motor acts as a resistance with an impedance that is much less than that normally presented by the motor 31 as a reactance causing increased currents to exist along lead 16a. This increased current through coil 97 of bimetal switch 95 causes heat and bimetal contact 99 changes shape so that end 99b makes contact with terminal 95b and breaks contact with terminal 96a. This causes terminal 51b of the D.C. motor 51 to be directly connected to terminal 44 of switch 43 via lead 16a. The motor 51 is then energized and drives the disk 53 continually into alignment with disk 54 and thus self-synchronizes the unit and de-energizes both motors. The heater coil 97 is for example 1.0 ohms and contact 99 changes state in about 3 to 5 seconds. The resistor 98 is a low valued resistance of about 10 ohms but will vary in value depending on the chosen characteristics of motor 31. The value of resistor 98 may reach zero if motor 31 is a low current device.

What is claimed is:

1. In an antenna rotator of the type including a first remote drive motor for rotating a remote shaft and a control unit including a second motor for driving an indicator-control member into alignment with a preselect member whereupon said motors are de-energized, the improvement for self-synchronization and de-energization of the two motors when the shaft has been rotated to an end stop position comprising:

coupling means for applying energizing potentials to said first motor, means coupled to said coupling means and responsive to increased current levels along said coupling means caused when said first motor is prevented from rotation by the end stop for applying said energizing potentials directly to said second motor causing direct energization thereof and alignment of the indicator-control member with the preselect member whereby both motors are synchronized and de-energized.

2. The combination of claim 1, wherein said coupling means includes a heater coil and said second means includes a bimetallic switch member responsive to the heat produced by the coil as a consequence of said increased current levels at the coil for changing state.

3. The combination of claim 1, wherein said first and second motors are D.C. motors and, wherein said energizing potentials are D.C. potentials.

4. The combination of claim 1, wherein said second motor turns faster than said first motor.

5. In an antenna rotator, including a first remote drive motor for rotating a remote shaft and a local control unit including a second motor and a cam coupled thereto for driving an indicator and for providing a control of the rotated position of the shaft, the improvement for self-synchronization of the two motors and de-energization when the shaft has been rotated to an end stop position comprising:

a power supply, a moveable preselector member and an indicator-control member, means coupled to said power supply means and responsive to non-alignment of said preselector member and said indicator-control member for applying energizing potentials over a first lead to said first motor and responsive to alignment of said preselector member andindicator-control member for removing said energizing potentials to said first motor, first switch means coupled to said first lead and said first motor for alternately providing at second and third leads said energizing potentials in response to the rotation of the first motor, a cam operated switch coupled to said second and third leads and responsive to the rotation of said second motor for alternately applying said potentials at said second and third leads to said second motor for controlling the rotation thereof, and second switch means coupled to said first lead and responsive to increased current levels caused when said first motor is prevented from rotation by the end stop for applying said energizing potentials on said first lead directly to said second motor causing energization thereof and alignment of said preselector member and indicator-control member whereupon said motors are synchronized and de-energized.

6. The combination of claim 5 wherein said first mentioned means includes a heater coil and said second switch means includes a bimetallic switch member responsive to the heat produced by the coil as a consequence of said increased current levels at the coil for changing states.

* * * * *